United States Patent [19]
Grinsted et al.

[11] Patent Number: 4,997,331
[45] Date of Patent: Mar. 5, 1991

[54] AIRCRAFT GROUND HANDLING VEHICLE

[75] Inventors: Timothy W. Grinsted, Ovingham; Alan R. Reece, Wylam, both of England

[73] Assignee: Soil Machine Dynamics Limited, Northumberland, England

[21] Appl. No.: 317,544

[22] Filed: Mar. 1, 1989

[30] Foreign Application Priority Data

Mar. 3, 1988 [GB] United Kingdom ................. 8805133

[51] Int. Cl.$^5$ .............................................. B64F 1/10
[52] U.S. Cl. .................................... 414/429; 180/904; 180/14.1; 244/50; 414/426; 414/563
[58] Field of Search ................. 244/50; 414/426–430, 414/563; 280/402, 479.1; 180/904, 14.1

[56] References Cited

U.S. PATENT DOCUMENTS

| 3,049,253 | 8/1962 | Cabral | 180/904 |
| 4,036,384 | 7/1977 | Johnson | 180/904 |
| 4,225,279 | 9/1980 | Boyer | 414/428 |
| 4,576,245 | 3/1986 | Oldani | 244/50 |
| 4,658,924 | 4/1987 | Dobbie | 244/50 |

FOREIGN PATENT DOCUMENTS

| 284836 | 10/1988 | European Pat. Off. | 244/50 |
| 3014767 | 10/1980 | Fed. Rep. of Germany | 180/904 |
| 87/06910 | 1/1987 | World Int. Prop. O. | |
| 88/05399 | 7/1988 | World Int. Prop. O. | |

Primary Examiner—Galen Barefoot
Attorney, Agent, or Firm—Charles E. Brown; Charles A. Brown

[57] ABSTRACT

An AGHV comprising a chassis 10 having front 11, 12 and rear 15, 16 wheels thereon, a support platform 25, 26 being movably mounted on the chassis 10 and jib 30 being provided on the chassis 10 for loading the nose-wheels of an aircraft onto the platform 25, 26; said platform 25, 26 being longitudinally movable between the first position wherein said nose wheels can be loaded thereon so as to be supported by the platform 25, 26 on the chassis 10 and a second position which is clear of said first position.

8 Claims, 8 Drawing Sheets

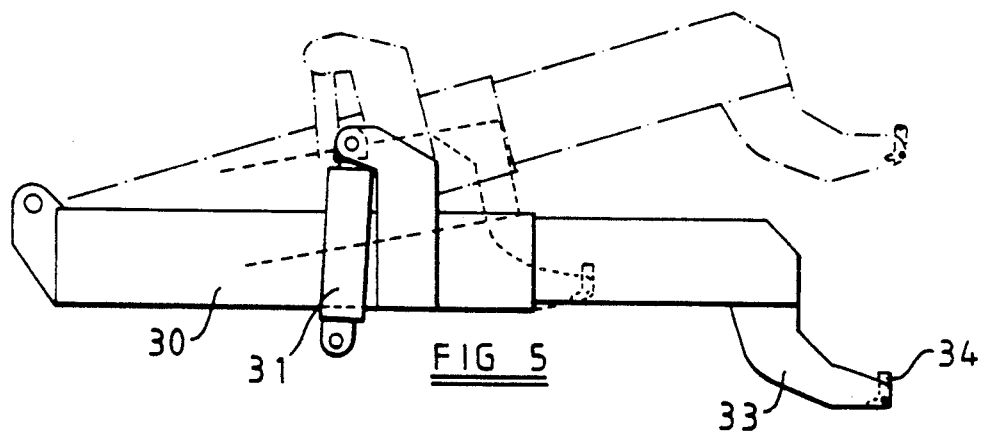
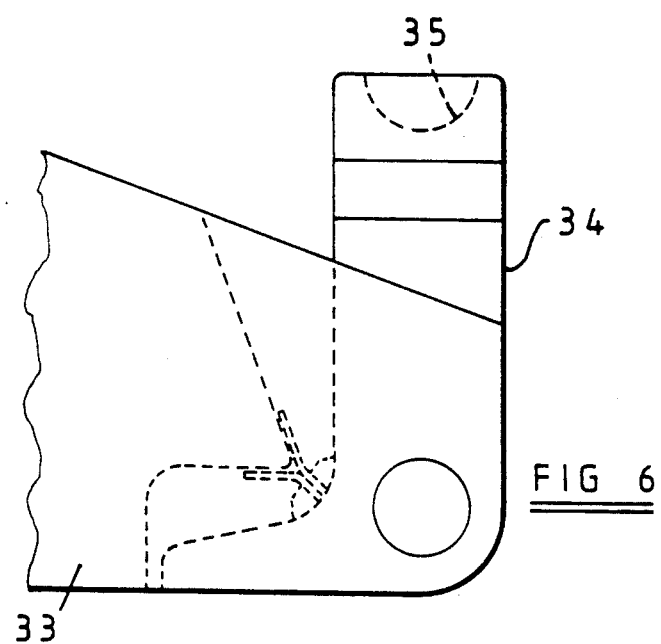
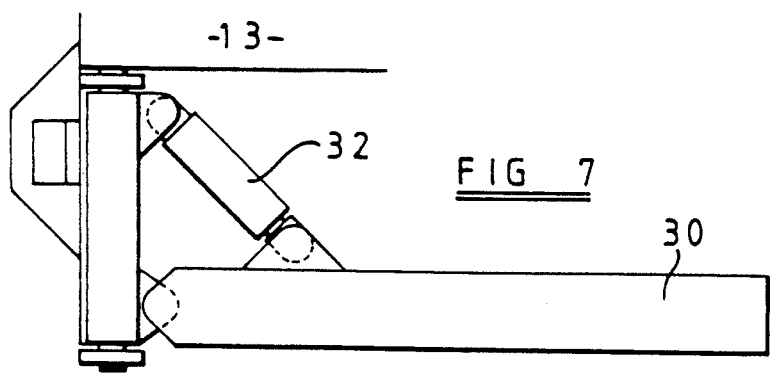

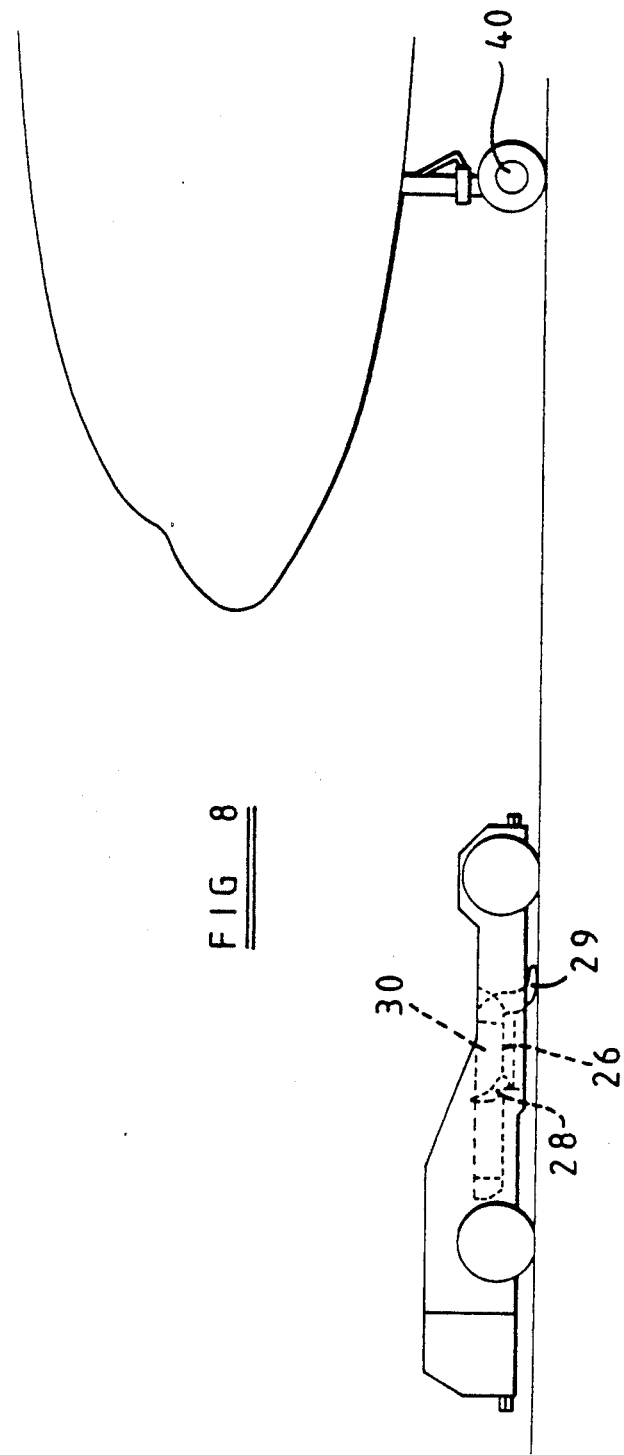

AIRCRAFT GROUND HANDLING VEHICLE

The present invention relates to an aircraft ground handling vehicle (AGHV) and in particular to an AGHV which is suitable for use with different types of commercial aircraft.

Aircraft are conventionally handled on the ground by attaching a tow bar to the nose wheel assembly and using a vehicle to pull or push the tow bar. This system has many disadvantages:
(a) labor intensive and slow;
(b) each type of aircraft requires a different tow bar type, the tow bar including shear pins to prevent damage to the aircraft;
(c) the tugs have to be relatively heavy to generate sufficient traction as there is no weight transfer from the aircraft to the tugs;
(d) a wide range of tug sizes is required. It is not permissible to use a large tug on a small aircraft due to the risk of imposing large forces on the aircraft nosewheel assembly;
(e) there is a risk of jack-knifing;
(f) the combined length of tug and tow bar dictates large turning circles and poor maneuverability;
(g) considerable time is wasted by the tug in moving tow bars around to and from the tow bar store;
(h) the method is unsuitable for use at higher speeds, see paragraph (e) above;
(i) the steering gear of the aircraft nosewheel has to be freed to enable the wheels to follow the tug. This is done either by disconnection of the steering linkage, which is labor intensive and unattractive, or by switching the steering hydraulics to float which permits only a limited steering and risks accidental reversion to fixed steering.

Various designs of AGHV have been proposed in an attempt to overcome these disadvantages by dispensing with the need for a tow bar by lifting the front wheels of the aircraft and supporting them in a cradle on the AGHV for transport. This leads to weight being transferred to the AGHV (typically 10% of the total aircraft weight) thus increasing the available traction and so allowing the weight of the AGHV to be reduced.

Of the previously proposed AGHV designs, the following four are considered as the most practical examples:

Secfer/Tracma (GB 1579017)

This vehicle loads the aircraft by forcing a retractable ramp under the front wheels of the aircraft. For this operation the rear aircraft wheels must be braked or chocked and the front wheels free to rotate. The aircraft front wheels are forced up the ramp and onto a platform which is then lifted off the ground. The wheels are locked in position on the platform and the ramp is closed. This system overcomes some of the problems associated with the tow bar system but the loading method is considered rather brutal. A turntable has been provided in one version of this vehicle although it is difficult to incorporate this feature in the lifting platform and so is generally absent, thereby necessitating the disconnection of the aircraft steering system.

Krauss Maffei PTS (DE 3616807)

This vehicle is U-shaped in plan, having a large rear cut-out. The vehicle is backed up to the aircraft until the aircraft front wheels engage against a ramp. A lifting device is then swung out from each side against the wheel and this pushes the wheel up the ramp, while supplying some lift. During this movement the tractor is pulled back. The lifting equipment is then locked for transport. This method overcomes the objections to tow bars with the exception of point (i). It is not possible to incorporate a turntable in this system and so the requirement to disconnect the aircraft steering linkage is a disadvantage.

With this design, it is not possible to make a single vehicle which is capable of lifting the largest aircraft while remaining sufficiently small to fit beneath a small aircraft and so different sizes of vehicle are required.

Echtman-Hamalchim (Engineering Incorporated EI-SID1220)

This vehicle has been developed for small military aircraft with hollow front wheel shaft ends. The vehicle is U-shaped and provided with opposed jacking pegs which locate the shaft ends and lift the front of the aircraft. This technique requires the steering gear to be disconnected. However, this system cannot be applied to commercial aircraft having front double wheels.

Air Traction Industries Asset (US 4658924)

The Asset lifts the front of the aircraft on the lift ball between the wheels (this is a universal feature on all commercial aircraft). The lift is applied using a telescopic jib pushing against the ground without loading the vehicle chassis. Once the aircraft is lifted a turntable which is fixed to the chassis is slid back under the wheels and the aircraft lowered onto the turntable. To achieve this, the chassis is telescopic and the whole rear end of the chassis with the turntable assembly located thereon is slid back. This concept leads to an intrinsically weak chassis and a long vehicle with poor turning circle.

Again, as with the Krauss Maffei PTS, it is not possible to make a single vehicle to this design which is capable of lifting the larger aircraft while remaining small enough to pass beneath smaller aircraft.

It is an object of the present invention to provide an AGHV which can obviate or mitigate the problems associated with previously proposed designs.

In accordance with the present invention, there is provided an AGHV comprising a chassis having front and rear wheels thereon, a support platform being movably mounted on the chassis and means being provided on the chassis for loading the nose wheels of an aircraft onto the platform; said platform being longitudinally movable between a first position wherein said nose wheels can be loaded thereon so as to be supported by the platform on the chassis and a second position which is clear of said first position.

It is an advantage of the present invention that the support platform is movable on the chassis and so allows the provision of a fixed length chassis.

In a one embodiment, the loading means and the first position are all within the wheelbase of the AGHV.

Preferably, the support platform comprises a turntable so obviating the need for disconnection of the aircraft steering.

It is particularly preferred that the first position (loading position) is ahead of or between a pair of rear wheels. The means for loading the aircraft wheels onto the platform is typically movable such that after loading or unloading the nose wheels, the means can be moved away from the first position.

It is particularly preferred that the AGHV comprises a chassis having front and rear wheels thereon, the supporting platform being mounted on the chassis, means being provided for loading the nose wheels of a aircraft onto the platform and arranged such that the weight of the aircraft is supported directly on the chassis when being loaded, the arrangement being such that the nose wheels of the aircraft can be loaded via the means onto the platform where the means ca be disengaged from the wheels.

The ability to support the weight of the aircraft directly on the chassis is an advantage in that it is not necessary to provide a further supporting mechanism to engage directly onto the ground to support the weight of the aircraft during the loading procedure hence simplifying the design of the loading means. Furthermore, the risk of damaging the ground surface or an lights mounted therein is reduced.

In one embodiment, the loading means comprises a lifting jib mounted on the chassis, the lifting jib typically being telescopic so as to be adjustable in length. The jib can be conveniently arranged for movement in both vertical and horizontal planes and may include a pivotable end section. The end of the lifting jib is typically engagable with a lifting ball provided between a pair of nose wheels on an aircraft.

In another embodiment the lifting means comprises one or more sets of wheel engaging means which are pivotably mounted on the rear portion of the chassis and can be swung into position behind the nose wheels of the aircraft, loading being effected by moving the platform backward so that the aircraft nose wheels are wedged up onto it between a ramp on the platform and the wheel engaging means on the chassis.

In this embodiment, the wheel engaging means are preferably sets of rollers or the like.

It is also preferred that the AGHV should be provided with hydraulic variable height suspension so that the rear portion of the chassis can be lowered to reduce the overall height of the platform so as to minimize the lift height required, particularly for small aircraft.

The present invention will now be described by way of example with reference to the accompanying drawings in which:

FIG. 5 is a detailed view of the lifting jib of the AGHV shown in FIG. 1;

FIG. 6 is a detailed view of the jib end shown in FIG. 5;

FIG. 7 shows a detailed view of an alternative mechanism for slewing the lifting jib of the AGHV shown in FIG. 1;

FIGS. 8–12 show the procedure for lifting and transporting an aircraft; and

Figure 1:
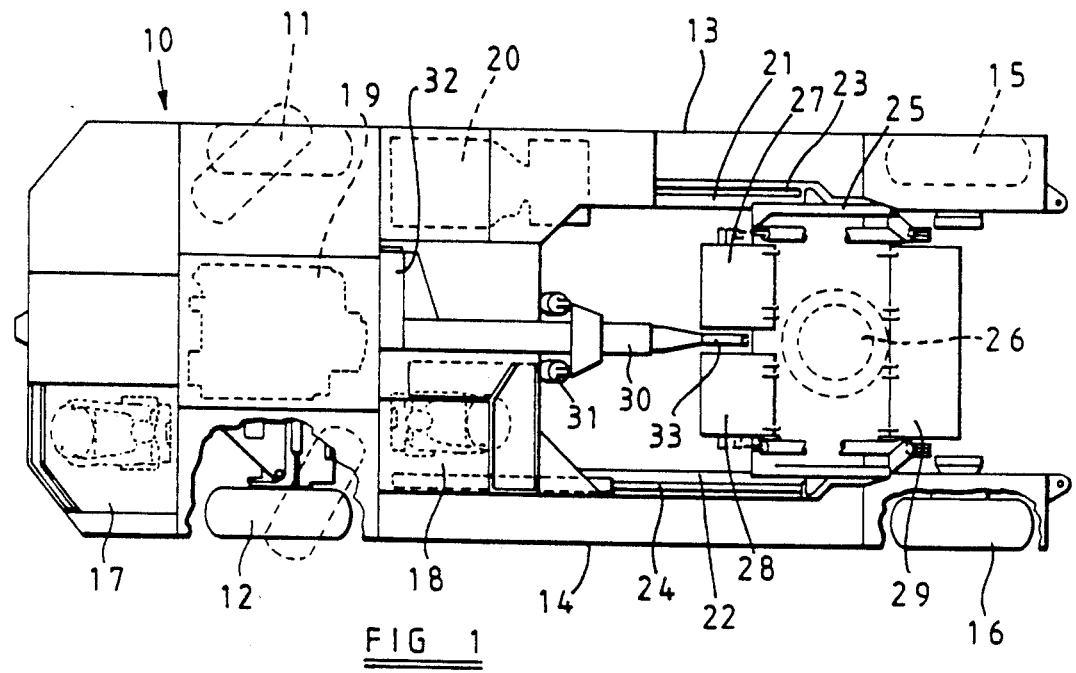
FIG. 1 is a plan view of an AGHV according to one embodiment of the present invention.

Referring now to FIGS. 1 to 4, the AGHV shown therein comprises a generally U-shaped chassis, the base of the U comprising a front portion 10 of the vehicle having a pair of steerable wheels 11, 12 and the side arms of the U comprising a pair of side booms 13, 14 each having a wheel 15, 16 at the outer end thereof.

The front portion 10 comprises the main body of the vehicle and includes front and rear control cabs 17, 18, a main power plant 19 and a ground power unit 20 for supplying auxiliary power to an aircraft. Both cabs 17, 18 have controls for driving the vehicle in either the laden or unladen state, the rear cab 18 additionally including controls for a lifting jib and turntable.

The main power plant 19 drives all wheels 11, 12, 15, 16 via hydrostatic drive transmission, the wheels preferably being of an appropriate size to take large aircraft tires.

Figure 2:
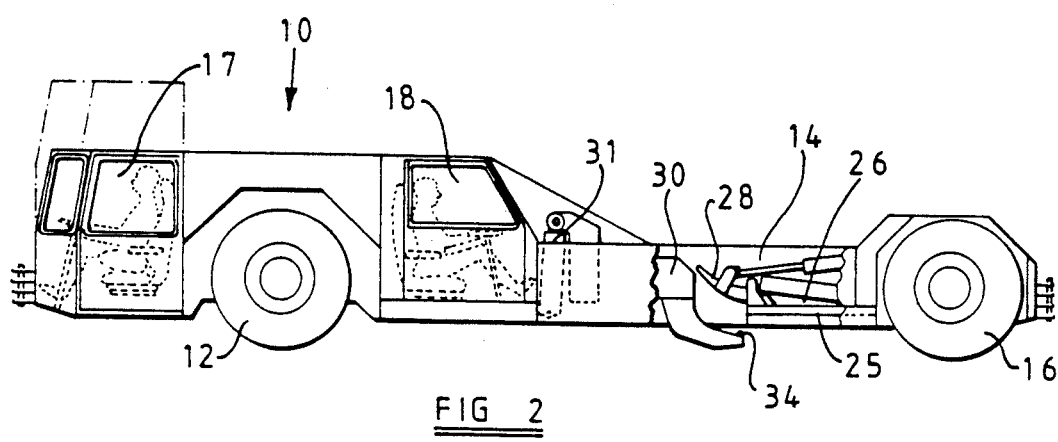
FIG. 2 is a side view of the AGHV shown in FIG. 1.
Figure 3:
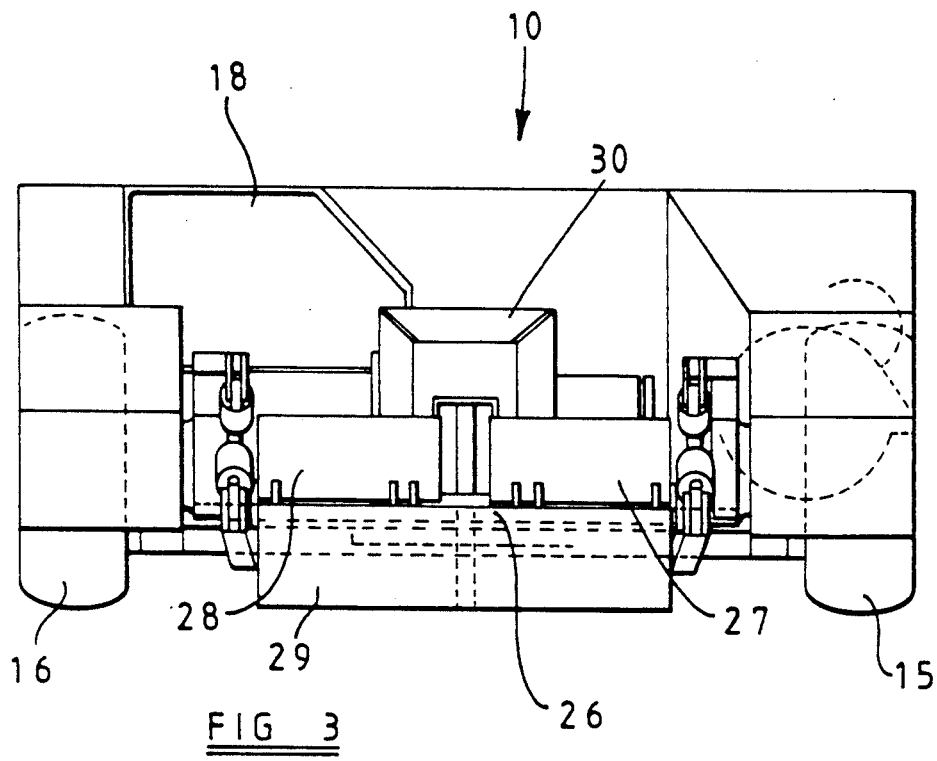
FIG. 3 is a rear view of the AGHV shown in FIG. 1.

A turntable unit is mounted on rails 21, 22 between booms 13, 14 so as to be slidable in the for and aft directions, the position of the unit being adjusted by means of a pair of hydraulic rams 23, 24. The unit is movable between a position which is just ahead of the rear wheels 15, 16 as shown in FIG. 2 to a position immediately behind the rear cab 18. The unit comprises a sliding carriage 25 having a main turntable 26 mounted thereon, the main turntable 26 having a pair of hydraulically controlled front chocks 27, 28 and a hydraulically controlled rear chock and ramp 29. The rear chock and ramp has rollers provided at its free edge.

A hydraulically controlled, telescopic lifting jib 30 is mounted on the main body adjacent the rear cab 18 so as to extend between the booms 13, 14. The jib 30 is provided with hydraulic cylinders 31 for raising and lowering the jib and a hydraulic cylinder 32 for slewing the jib from side to side. The mechanism for extending an retracting the jib is enclosed within the jib and is not shown. An alternative arrangement for the slewing cylinder 32 is shown in FIG. 7. The lifting point of the jib 30 comprises an arm 33 which extends downwardly and away from the end of the telescopic portion of the jib. A lifting socket 34 is pivotally mounted on the free end of the arm 33 and is provided with a cup-shaped recess 35 at the top thereof and a level indicator and adjuster (not shown) by which the jib can be extended to maintain the socket 34 in a generally vertical attitude. A load sensor (not shown) is also incorporated into the socket 34 to provide information regarding the weight of an aircraft being lifted.

Figure 4:
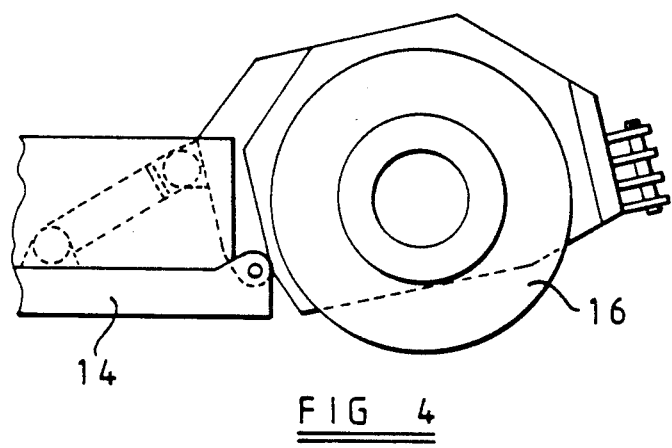
FIG. 4 is a view of the rear section of the AGHV shown in FIG. 1 in an alternative position.

The suspension system of the rear wheels 15, 16 on the respective booms 13, 14 is preferably adjustable so as to allow the rear portion of the chassis to be lowered relative to the ground (see FIG. 4).

The operation of the AGHV described above will now be described in relation to FIG. 8-12.

The unladen vehicle with the lifting jib 30 retracted and the turntable unit in its forward position is backed up to the nose wheels 36 of an aircraft (in this case, a large airliner such as a Boeing 747). When the vehicle is a few meters from the nose wheels 36, the rear chock ramp 29 is lowered to form a ramp up to the turntable 26, the roller supporting the ramp on the ground (see FIG. 8).

Figure 9:
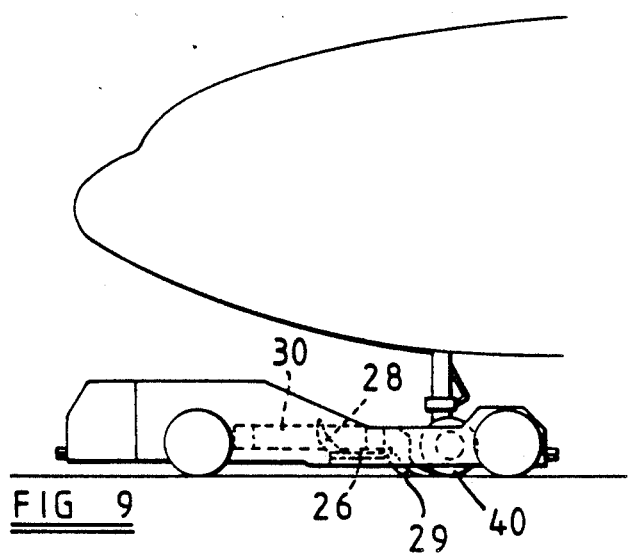

The vehicle is backed towards the wheels 36 until the ramp is just ahead of the wheels which are between the booms 13, 14, just ahead of the rear wheels 15, 16. This position may be indicated by the braking of a light beam by the wheels 36 (FIG. 9).

Figure 10:
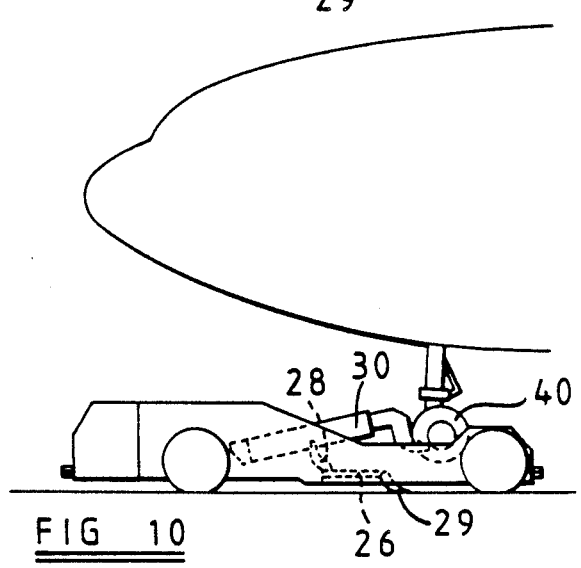

The lifting jib 30 is extended and the socket 34 engaged on the lifting ball which is provided between the nose wheels 36 of the aircraft. A television camera may be provided in the socket 34 with a display in the rear cab to assist in this. Once the socket and ball are engaged, the nose wheels 36 are lifted by raising the jib 30 until the wheels 36 are above the level of the turntable 26 (FIG. 10). In this operation the main wheels of the aircraft and the wheels of the AGHV are braked. As the wheels 36 and the jib end follow diverging arcs during lifting, the jib is extended and the socket adjusted to maintain a vertical lift and minimize horizontal forces applied to the nosewheel assembly.

Figure 11:
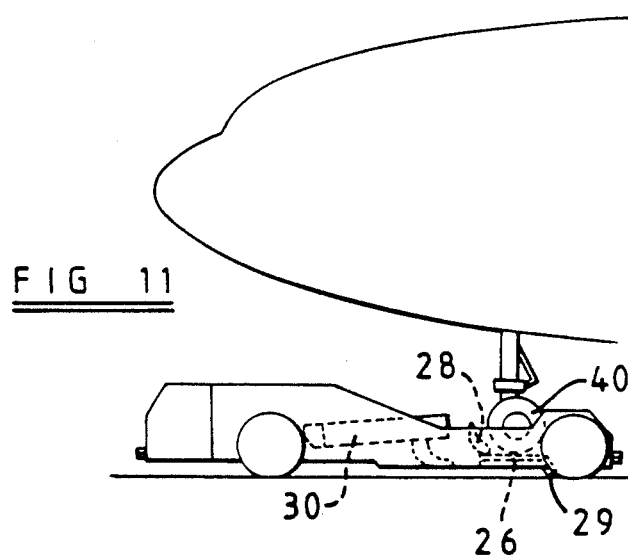
Figure 12:
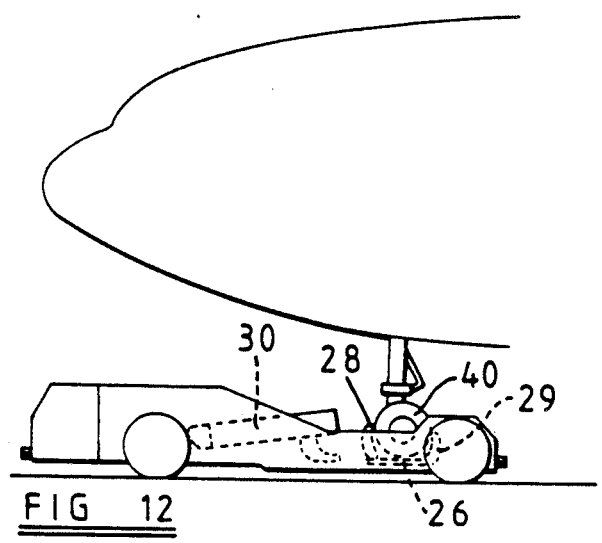

The turntable unit is then slid rearwardly along the chassis until the center of the turntable 26 is below the castor axis of the wheels 36. The jib 30 is lowered and the weight of the aircraft is taken on the turntable, the socket 34 being disengaged from the lifting ball and the jib retracted (FIG. 11). The front chocks 27,28 and the rear chock ramp 29 are swung in to grip the tires of the wheels 36, the position of the chocks also serving to give an indication of the type of aircraft (weight, size etc.) from the size of the front tires (FIG. 12).

The aircraft may now be towed or pushed back, and steered without the need to disconnect the aircraft steering due to the action of the turntable. This also allows a small turning circle and great maneuverability as the overall length of the AGHV is small.

The unloading procedure can be the reverse of the loading procedure described above but a simpler method is also possible. In this latter case, the turntable is aligned for and aft for unloading. The AGHV and aircraft main wheel brakes are applied and the front and rear chocks are released, the rear chock being lowered to form a ramp. The turntable unit is then slowly pulled forward along the chassis so that the nose wheels 36 roll down the ramp onto the ground. The ramp may then be raised and the vehicle driven away.

Figure 13:
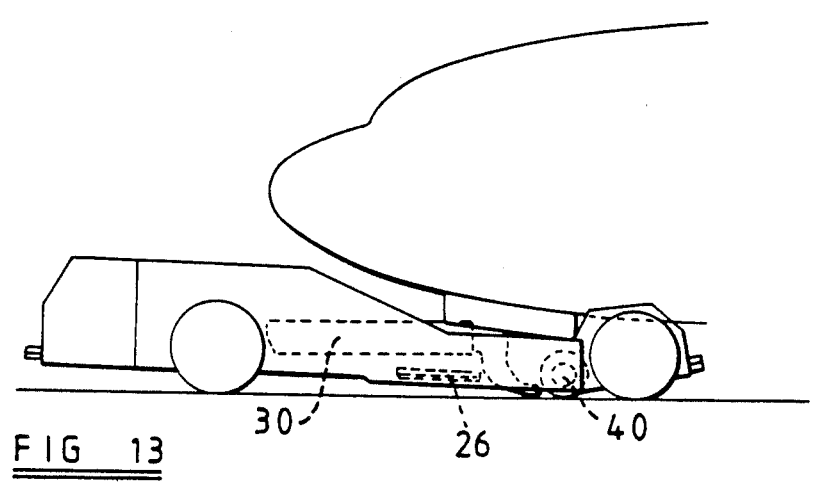
FIGS. 13 and 14 show an alternative feature for lifting and transporting a smaller aircraft than shown in FIGS. 8–12.
Figure 14:
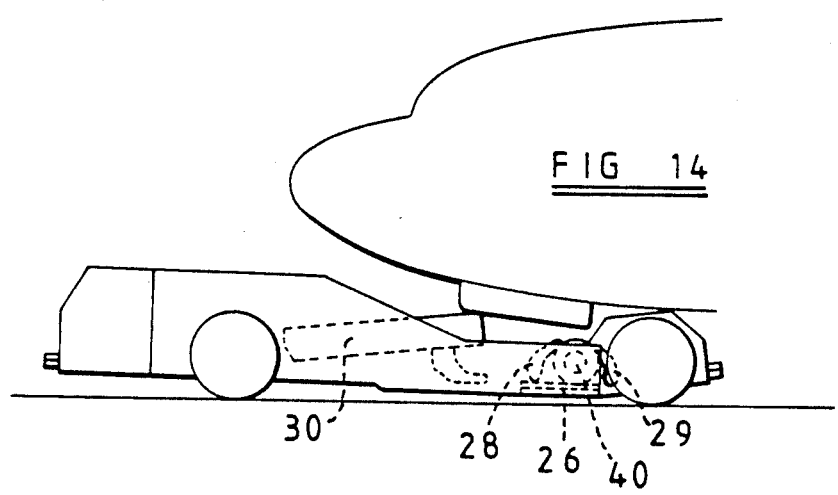
Figure 15:
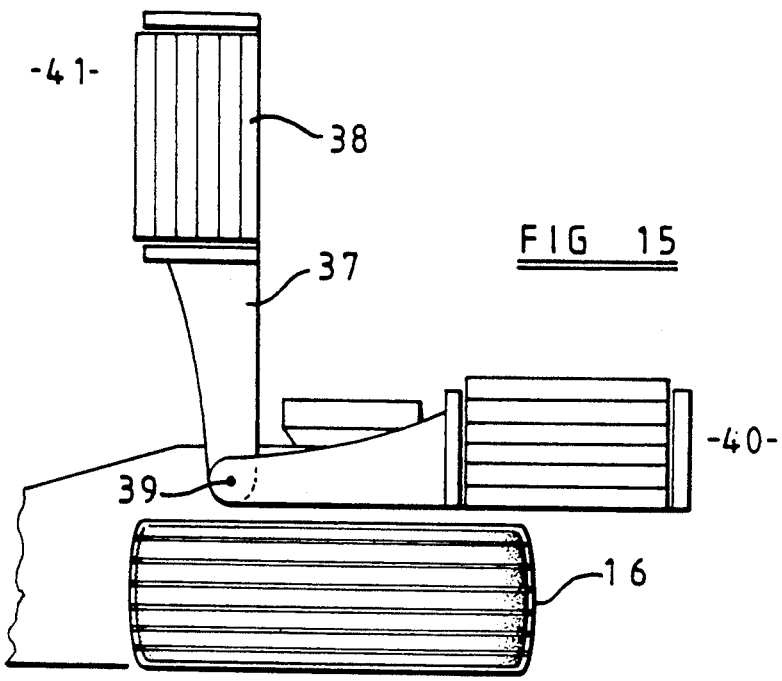
FIGS. 15–18 show an alternative arrangement for locating the nose wheels of an aircraft on the turntable.
Figure 16:
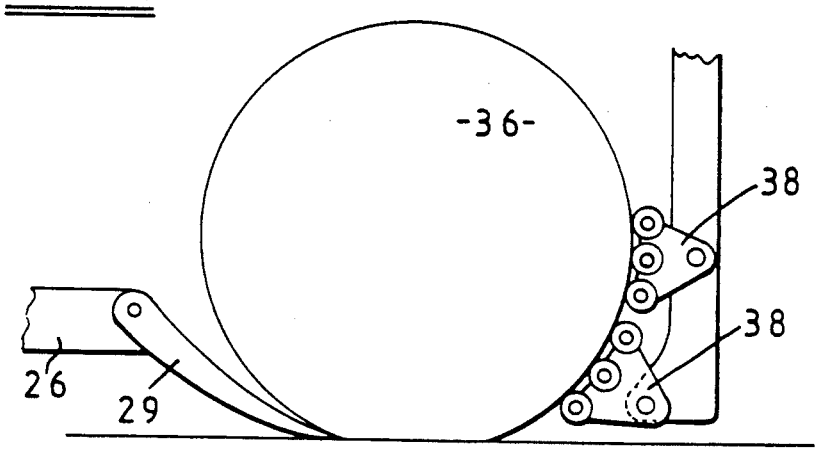
Figure 17:
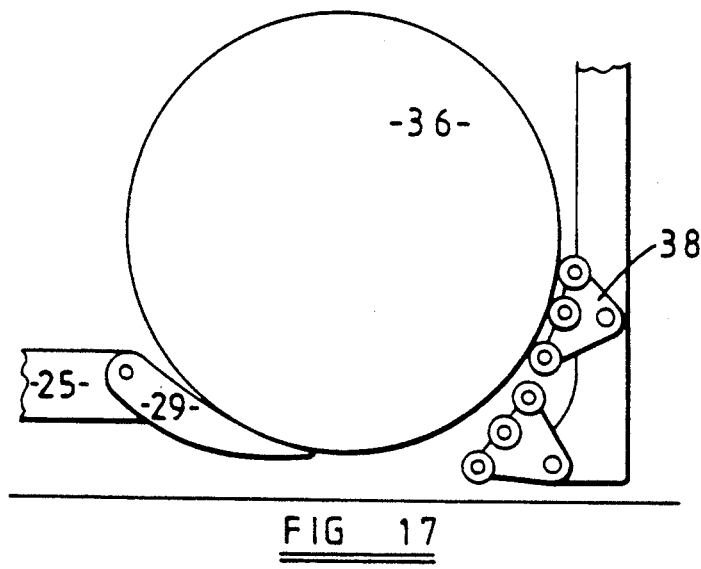

FIGS. 13 and 14 show the procedures for a smaller aircraft (e.g. Boeing 737) having a lower ground clearance at the front. Before backing up to the wheels 36, the rear chassis is lowered such that the turntable is closer to the ground. This reduces the height of lift for the wheels 36. The chassis may be raised after the wheels are chocked on the turntable or alternatively, the chassis may remain in the lowered position for transportation. The chassis may be lowered for unloading.

The present invention has the advantage that a single vehicle is applicable to all sizes of commercial aircraft. This is particularly achieved by the use of special wheels and tires which can incorporate powerful hydraulic motors which are useful for moving larger aircraft while being of sufficiently small diameter for use with smaller aircraft having lower ground clearance. The lowering chassis arrangement described above is also useful for smaller aircraft.

Typically an AGHV of the type described above weighs about 20 tons and has a maximum turntable load of about 40 tons. Using a typical power plant and hydraulic drive system the vehicle can move at up to 20 kilometers per hour when laden and 30 kilometers per hour unladen. By controlling the pressure in the hydraulic transmission of the AGHV the maximum force applied to the nosewheel assembly can be limited to suite different types and prevent damage. Load measuring devices may be incorporated into the nosewheel support platform to maintain these forces.

When transporting the aircraft, the braking is achieved by braking the hydraulic transmission of the AGHV. However, if the pilot of the aircraft wishes to disengage the aircraft from the AGHV, for example to avoid a collision, he can do this by applying the aircraft brakes on the main aircraft wheels which will pull the aircraft back on the turntable against the rear chock and ramp. This is fitted with a pressure sensor and should the loading on this chock become too great, it is lowered to form a ramp such that the aircraft wheels can roll off the turntable onto the ground.

It will be apparent that various features of the AGHV described above can be omitted while maintaining the essential principles of the invention.

Most of the advantages described can be achieved using other lifting means to raise the aircraft nose wheels onto the platform. One such means is shown in FIGS. 15, 16, 17 and 18. Th lifting jib described previously is replaced by a pair of arms 37 pivoting on the main frame of the vehicle, said arms each carrying roller assemblies 38 as shown on FIG. 15. The arms 37 pivot about an axis 39 inclined slightly to the vertical so that the rollers 38 move downward in moving from the stowed position 40 to the working position 41.

The operation of the AGHV when fitted with this lifting arrangement will now be described in relation to FIGS. 15–18.

The unladen vehicle with the arms 37 stowed, the turntable unit in its forward position and the rear ramp 29 lowered is backed up to the front wheels 36 of an aircraft (in this case, a large airliner such as a Boeing 747). The vehicle is backed up until the roller assemblies 38 can be swung out to just engage with the rear of the aircraft wheels (see FIG. 16). The carriage 25 is then moved backwards while at the same time the rear ramp 29 is raised, to provide the lifting sequence shown in FIGS. 16, 17 and 18.

While the roller assemblies in this case merely provide a fixed stop for the wedging action, it is possible that means could also be provided to achieve a gripping and lifting action on the wheels 36.

Figure 18:
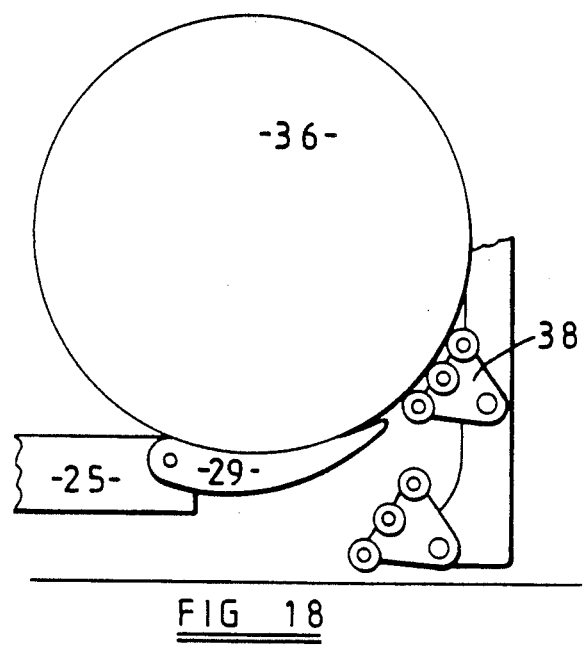

The aircraft wheels 36 are rolled right forward from the position shown on FIG. 18 by a combination of driving the vehicle backwards and raising the ramps 29.

We claim:

1. An aircraft ground handling vehicle, comprising:
a chassis;
front and rear wheels mounted on said chassis and defining a wheelbase of said vehicle;
means on said chassis for driving said wheels;
a platform means mounted on said chassis for supporting a nose wheel of an aircraft;
means for moving said platform means axially of said chassis relative to said front and rear wheels between a first position wherein said platform means is adjacent said rear wheels for receiving the nose wheel of the aircraft, and a second, retracted position remote from said rear wheels, to enable the nose wheel to be received within the wheelbase of the vehicle;
and lifting means mounted on said chassis and adapted to engage and raise the nose wheel whereby to enable movement of said platform means into said first position to receive the nose wheel.

2. A vehicle as claimed in claim 1, wherein said lifting means are arranged such that the weight of the aircraft is supported directly on the chassis when the nose wheel is being loaded onto the platform, the arrangement being such that the lifting means can be disengaged from the nose wheels after lifting.

3. A vehicle as claimed in claim 1, wherein said lifting means are movably mounted on the chassis such that the lifting means can be moved away from the first position after use.

4. A vehicle as claimed in claim 1, wherein the platform means comprises a turntable.

5. A vehicle as claimed in claim 3, wherein the lifting means comprises a lifting jib movably mounted on the chassis.

6. A vehicle as claimed in claim 3, wherein the lifting means comprises at least one nose wheel engaging means which is pivotably mounted on a rear portion of the chassis.

7. A vehicle as claimed in claim 6, wherein the nose wheel engaging means comprises at least one set of rollers.

8. A vehicle as claimed in claim 1, wherein hydraulic variable height suspension is provided which allows a rear portion of the chassis to be lowered so as to reduce the overall height thereof.

* * * * *